(12) United States Patent
Barker

(10) Patent No.: US 7,097,245 B2
(45) Date of Patent: Aug. 29, 2006

(54) VEHICLE CHILD SEAT

(75) Inventor: Derrick J. Barker, Droitwich (GB)

(73) Assignee: Equipbaby Limited, (GB)

( * ) Notice: Subject to any disclaimer, the term of this patent is extended or adjusted under 35 U.S.C. 154(b) by 0 days.

(21) Appl. No.: 11/126,183

(22) Filed: May 11, 2005

(65) Prior Publication Data
US 2006/0055218 A1    Mar. 16, 2006

(30) Foreign Application Priority Data
Sep. 14, 2004    (GB) ................. 0420414.5

(51) Int. Cl.
*B60N 2/26* (2006.01)

(52) U.S. Cl. .................. 297/256.14; 297/256.16

(58) Field of Classification Search .......... 297/256.16, 297/256.14, 256.13, 256.11, 256.1, 250.1
See application file for complete search history.

(56) References Cited

U.S. PATENT DOCUMENTS

| | | | |
|---|---|---|---|
| 5,836,650 A * | 11/1998 | Warner et al. | 297/256.11 |
| 6,000,753 A | 12/1999 | Cone, II | |
| 6,193,312 B1 | 2/2001 | Yoshida et al. | |
| 6,318,799 B1 * | 11/2001 | Greger et al. | 297/256.13 |
| 6,439,660 B1 | 8/2002 | Guenther | |
| 6,817,665 B1 * | 11/2004 | Pacella et al. | 297/250.1 |

FOREIGN PATENT DOCUMENTS

| | | |
|---|---|---|
| DE | 4329885 | 5/1995 |
| EP | 0164909 * | 12/1985 |
| EP | 1145898 | 10/2001 |
| EP | 1279554 | 1/2003 |
| EP | 1418085 | 5/2004 |
| FR | 2435371 | 4/1980 |
| FR | 2787977 | 12/1998 |
| GB | 2282321 | 4/1995 |

OTHER PUBLICATIONS

International Search Report dated Mar. 3, 2004, Appl. No. EP 03 02 5182, 3 pages.

* cited by examiner

*Primary Examiner*—Milton Nelson, Jr.
(74) *Attorney, Agent, or Firm*—Connolly Bove Lodge & Lhutz LLP

(57) ABSTRACT

A vehicle child seat, in particular a child's car seat, including a seat module demountably attachable to a base module, and configurable between rearward-facing and forward-facing configurations. The base module includes a retractable and pivotable support leg and a headrest element. The seat module is adapted to interact with the headrest element to prevent pivoting of the support leg when in a deployed configuration.

11 Claims, 6 Drawing Sheets

VEHICLE CHILD SEAT

FIELD OF THE INVENTION

The present invention relates to a vehicle car seat, in particular a car seat.

BACKGROUND OF THE INVENTION

Child safety seats for restraining young children in cars are well known. There are four conventional stages for child safety seats. Firstly, stage 0 covers the age range from birth to around 6 –12 months. The devices in this category typically comprise an infant carrier, in which the baby reclines, removable from the vehicle and carry able by means of an integral folding handle. They are usually installed in a "rear-facing" configuration, in which the child faces the rear of the vehicle, and are secured against a vehicle seat by the vehicle's own three-point seatbelt. As the child grows, they move to Stage 1 (covering the 9 kg to 18 kg weight range). Typically, these seats include a forward-facing bucket-type seat secured to the vehicle using the 3-point seatbelt. The seat itself includes a 5-point harness to restrain the child securely. Stage 2 seats cover the weight range from 15 kg to 25 kg (typically ages 1 to 6 years). These seats typically including a booster-seat element, elevating the child from the surface of the vehicle seat, and an integral back-rest. The back-rest may include a 5-point harness, or may include means for routing the vehicle's 3-point seat belt across the child's chest. Finally, Stage 3 covers the weight range from 15 kg to 36 kg, and is typically used with older children (4 to 11 years). Stage 3 seats are essentially simple booster seats, elevating the child so that the vehicle's 3-point seatbelt fits appropriately across the child's shoulder and chest, avoiding the neck. Some booster seats include a seatbelt guide to lower the height of the seatbelt where it passes over the child's shoulder.

Conventionally, a user has to purchase a separate seat for each stage of a child's growth. This obviously has significant cost implications. Seats have been developed which cover both Groups 2 and 3, wherein a Group 3 booster seat is additionally provided with a detachable seat back element. More recently, combined Group 1,2 and 3 seats have been available, for example, the Britax TRIO or Javelin (trade marks).

The present invention seeks to provide a child's car seat having advantages over existing seats, providing structural elements which can be combined in different configurations to provide a seat suitable for use from birth to 3 years or older.

BRIEF SUMMARY OF THE INVENTION

In its broadest sense, the present invention provides a child's car seat comprising a seat module demountably attachable to a base module. The car seat is configurable between rearward-facing and forward-facing configurations. The base module includes a retractable and pivotable support leg and a headrest element. The seat module is adapted to interact with the headrest element to prevent pivoting of the support leg when in a deployed configuration.

Preferably, the headrest element comprises a headrest body pivotably mounted upon the base module. Alternatively, the headrest body is pivotably mounted upon a headrest rail, slidably mounted in the base module.

The base module includes a first surface defining, in the rearward-facing configuration, a first lower surface which, in use, sits upon the surface of the car seat. The first lower surface generally defines a base plane. Preferably, the angle between the support leg when the deployed configuration and the base plane is greater than 90°.

Preferably, the support leg includes a telescoping leg assembly.

In one embodiment, the support leg is pivotably mounted upon the headrest element, preferably upon the headrest body.

Suitably, the support leg is pivotably mounted at one end of the telescoping leg assembly.

In an alternative embodiment, the telescoping leg assembly is slidably mounted upon a guide rail assembly and is slidable between a stowed position and an extended position whereby the leg assembly is pivotable with respect to the base module.

BRIEF DESCRIPTION OF THE SEVERAL VIEWS OF THE DRAWING

The above and other aspect of the present invention will now be described in further detail with reference to the accompanying figures in which.

DETAILED DESCRIPTION

Figure 1:
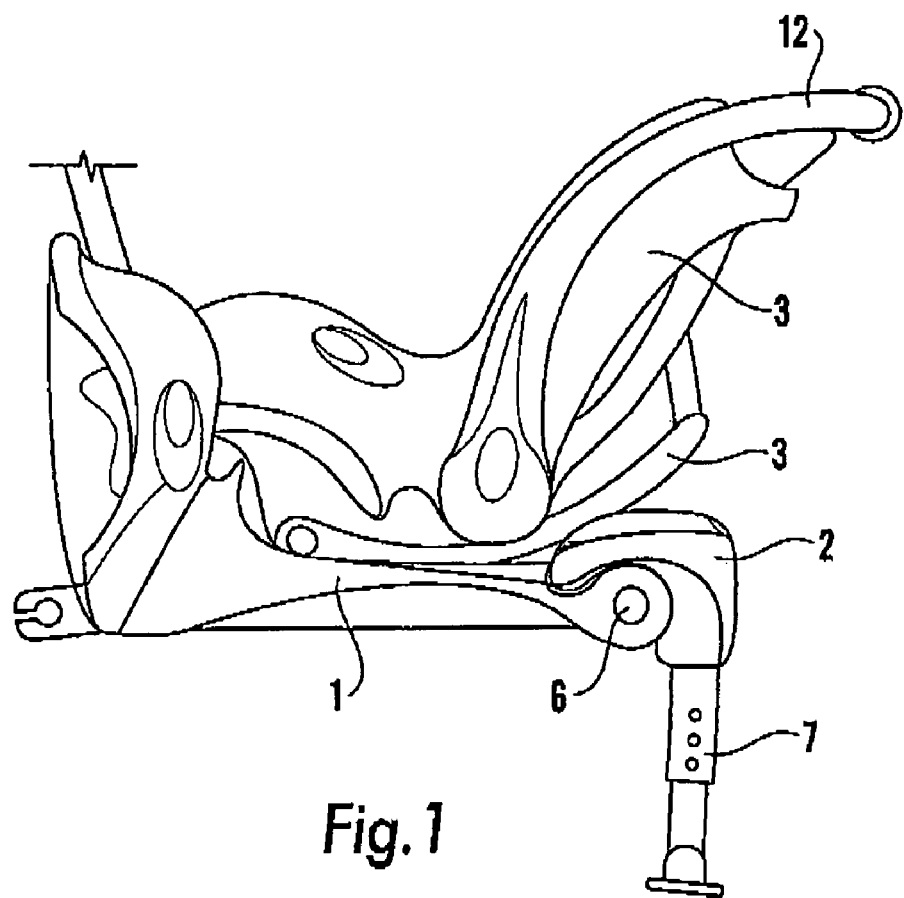
FIG. 1 is a side view of a first embodiment of a child seat in accordance with the present invention in a rearward-facing configuration.
Figure 2:
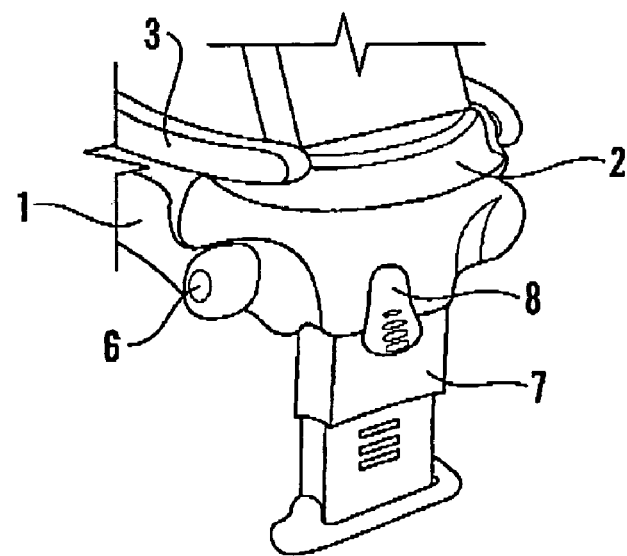
FIG. 2 is a part rear perspective view of the embodiment of FIG. 1.
Figure 3:
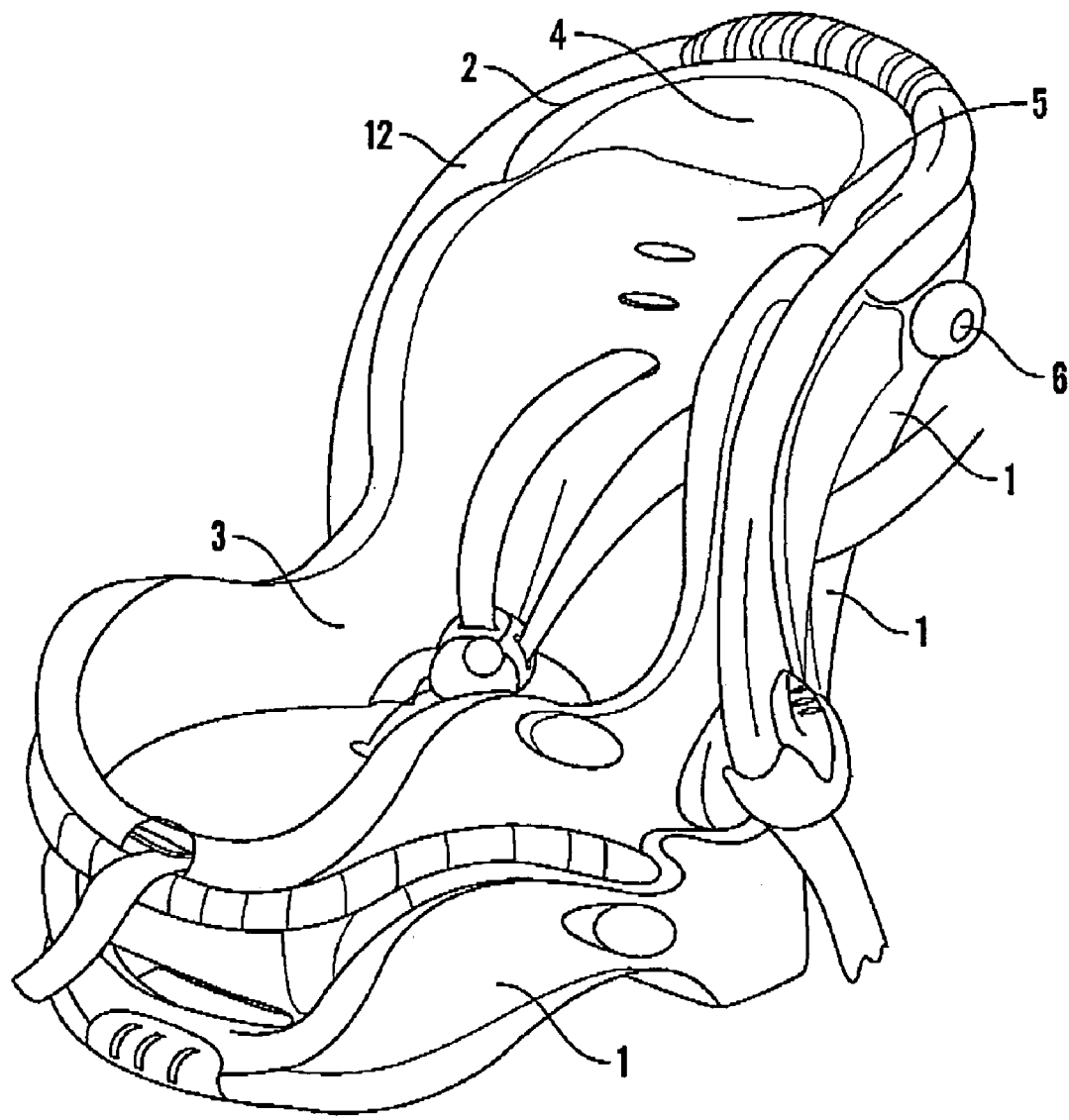
FIG. 3 is a front perspective view of the embodiment of FIG. 1 in a forward-facing configuration.

Referring to FIGS. 1 to 3, there is shown a child car seat having a base module 1, which engages and retains a removable infant car seat module 3. The seat is configurable as a rearward-facing Stage 0 seat (FIGS. 1 and 2) or as a forward-facing Stages 1 & 2 seat (FIG. 3). The base module 1 has a support leg 7, which, in the Stage 0 configuration, contacts the floor of the vehicle to stabilise the child restraint during dynamic conditions. The car seat module includes a 'bucket' type seat body with a stowable carrying handle 12.

Support leg 7 is telescopingly adjustable for length to adapt to variations in depth from one vehicle to another between seat and floor height. The inclusion of a base with a support leg is known however in this particular invention the support leg differs from others in several ways.

Firstly the support leg 7, can be combined as a fixed or removable element to a head support element 2, which pivots 6 at one end of a base structure. When the support leg 7 is in use for a rearward facing car seat, the head support element 2 can provide support to the removable infant car seat module 3. The infant car seat module 3 interfaces with the headrest element 2 so as to prevent rotation of the headrest and support leg assembly.

The geometry of the base module 1 and the support leg 7 when in use can adopt either an acute angle less than 90° or an obtuse angle of great than 90°. When positioned for use, the headrest and support leg assembly is prevented from rotating about the pivot 6 by the base structure 1 inhibiting movement to increase the angle. In addition an interface with the infant car seat base 3 and the headrest 2.

When the headrest 2 and support leg assembly is not in use and the base 1 is repositioned to provide for forward facing child restraint the assembly is repositioned to store the leg element essentially parallel with the base 1 back surface and in so doing align the headrest element 2 into an extended head support surface 4 to be combined with the seat surface 5 of the removable infant car seat element 3 so as to provide an extended seat surface for the older child.

Figure 4:
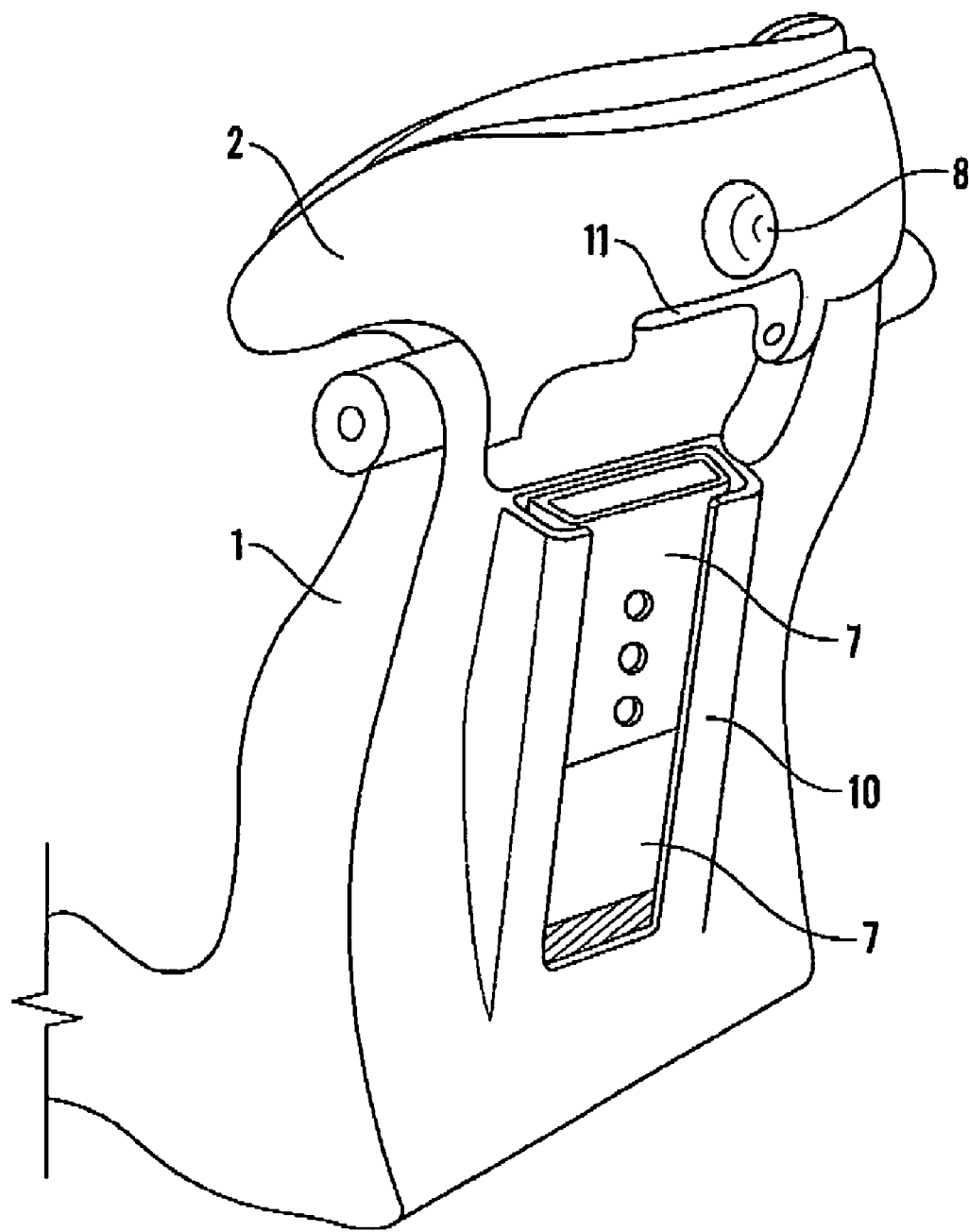
FIG. 4 is a rear perspective view of a second embodiment of a child seat in accordance with the present invention.
Figure 5:
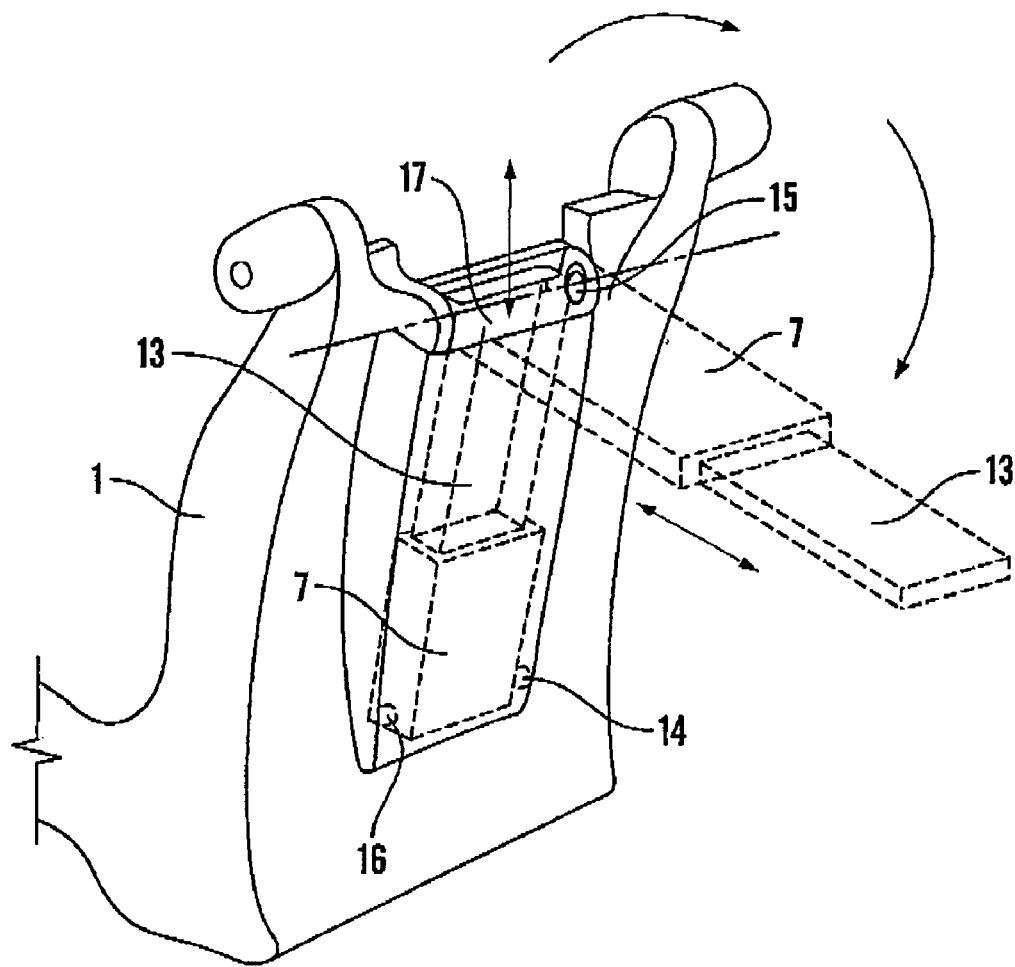
FIG. 5 is a detailed view of the embodiment of FIG. 4 showing operation of the support leg.

An alternative module embodiment is illustrated in FIGS. 4 and 5. Telescoping support leg 7 includes lugs 14,16 to allow the leg to slide within a track 10 within the base module prior to pivoting at the end 15 of track 10 and extension of the telescoping leg elements.

The support leg can be extracted and rotated about a movable pivot axle towards the base 1 so as to adopt a support position. The pivot acting both as a sliding guide in a track within the channel and a rotating axle when being set in a fixed support position.

In the embodiment of FIG. 3, the base module has been reversed such that part which formed the lower surface of the base module in the rearward-facing configuration forms the generally upright back of the base module in the forward-facing configuration. Those skilled in the art will be easily able, non-inventively, to construct suitable engagement mechanisms to allow the seat module 3 to engage and be retained by the base module 1 in both configurations.

In the embodiment of FIGS. 6 to 9, there is shown an infant car seat 20 including a base module 21 and a seat module 22 which includes a pivotable carrying handle 23.

Base module 23 includes side walls 24 forming a generally u-shaped retaining structure for seat module 22 with bracing cross-braces 25. In side profile, side walls 24 are generally L-shaped to form first and second contact surfaces 30, 31, 31' which, in use contact the 31 seat 32 and seat back 33 of the vehicle. A head rest boy 34 is pivotally mounted between the legs of the base module 23 forming the second contact surfaces 31, 31'.

The headrest body 34 incorporates a head rest surface 35 and an extending support leg 40. The headrest and support leg assembly can rotate so as to be positioned to support the infant car seat when rearward facing. When the base module is repositioned to be used in a forward-facing configuration, the headrest is aligned such that surface 35 integrates with the surface 41 of the infant car seat module 22 forming the back of the seat to form a continuous seat surface, suitable for the older child.

Figure 6:
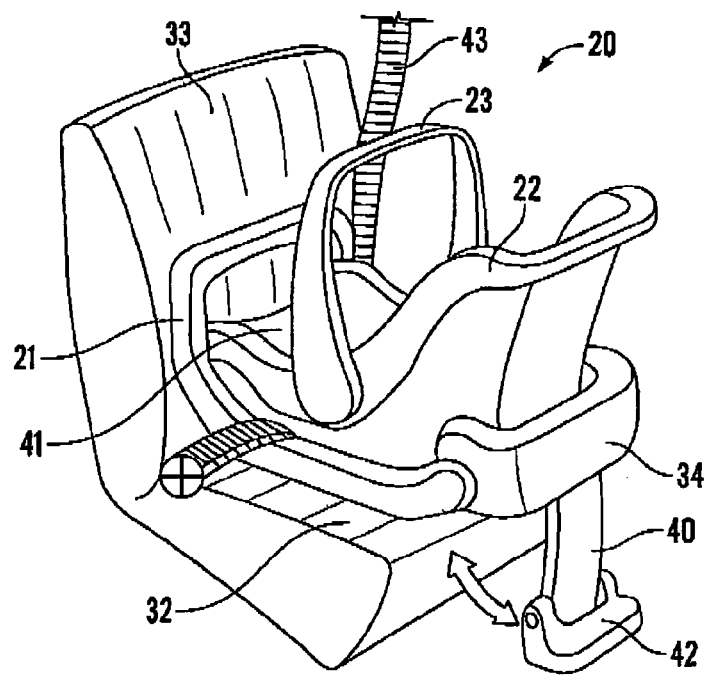
FIG. 6 is a perspective view of a third embodiment of a child seat in accordance with the present invention in a rearward-facing configuration.
Figure 7:
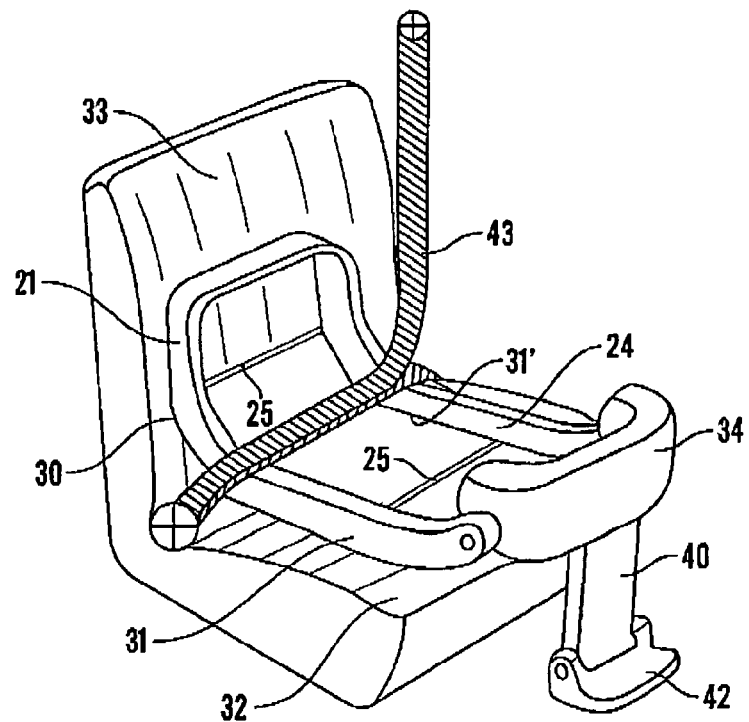
FIG. 7 is a perspective view of the base module of the seat of FIG. 6, with the seat module removed.
Figure 8:
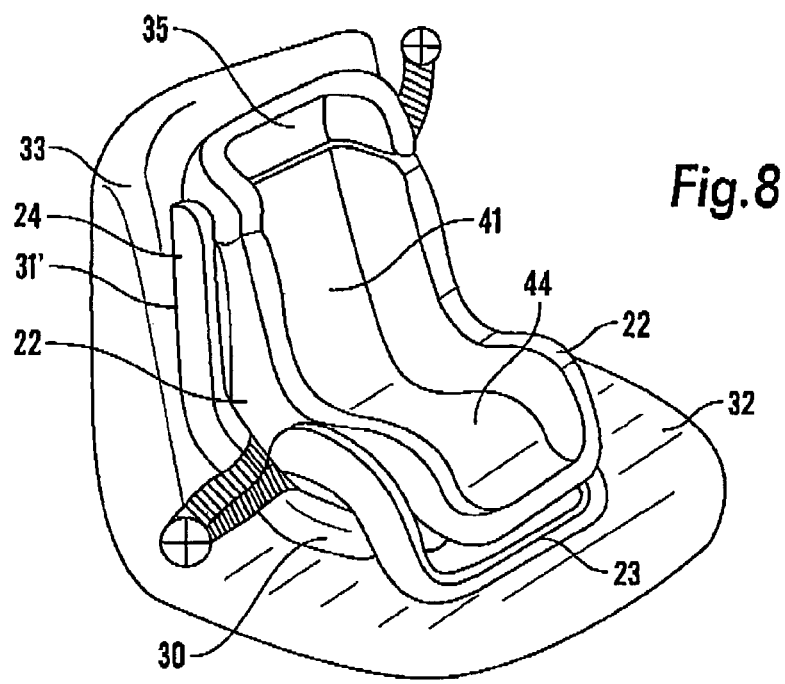
FIG. 8 is a perspective view of the seat of FIG. 6 in a forward-facing configuration.

As will be appreciated from a comparison of FIGS. 6 and 8 in the embodiment shown, the seat module 22 includes first and second seat surfaces 41, 44. In rear-ward facing configuration (FIG. 6), first seat surface 41 forms the seat surface and second seat surface 44 forms the surface of the seat back. In the forward-facing configuration, the positions are reversed. This allows a single seat to take account of the different requirements for providing adequate support for the bodies of babies and older children.

First contact surface 30 on the base module 21 is positioned against the vehicle seat back surface 33 for a rearward-facing infant car seat (FIGS. 6 & 7) and is positioned against vehicle seat surface 32 when used forward facing for the older child. Similarly, second contact surfaces 31, 31' on the base module positioned against vehicle seat back surface 33 when used forward facing for the older child.

Figure 9:
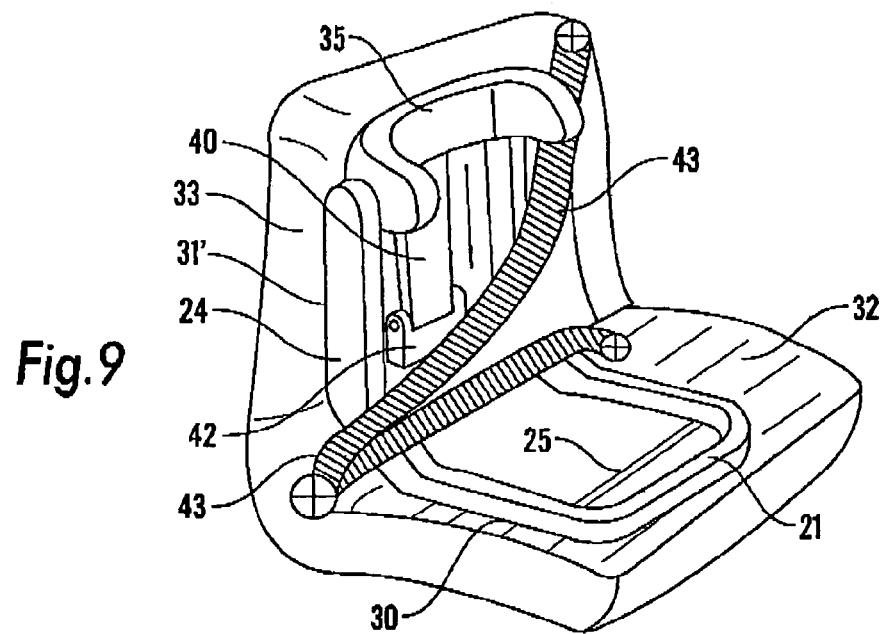
FIG. 9 is a perspective view of the base module in FIG. 7 in a forward-facing configuration.

Support leg 40 includes a pivotable foot 42 which, in use in the rearward-facing configuration, contacts the floor of the vehicle in front on the vehicle seat. In the forward-facing configuration, pivotable foot 42 is stowable out of the way (FIG. 9).

Base module 21 is secured in place against the vehicle seat surfaces 32, 33 using the conventional 3-point lap belt or harness 43.

The following statements set out certain preferred features and characteristics of the present invention.

1. A car seat base element having a headrest element pivotal at one end.
2. As described above said headrest able to adopt the position supporting the separate car seat shell when rearward facing and combining as an extension to the common seat surface of the separate seat shell.
3. A headrest that incorporates an extendable support leg.
4. A headrest with an attachment to receive a separate and removable support leg.
5. At headrest incorporating an extending leg which is an single and independent part which can combine with the base in specified fixed positions.
6. A headrest which has a surface which supports the head that has commonality with a separate and removable car seat.
7. A headrest as described above, positioned at one end of a base, which act to support a removable car sea and interfaces with the headrest so as to resist rotation of the headrest element.
8. As described above a support leg, which adopts an obtuse angle greater than 90°, between the nominal direction of loading of the support leg and the nominal surface of the base, being the same surface, which sits upon the vehicle seat cushion, such that when under high dynamic loading the angle between the two element is encouraged to increase.

The invention claimed is:

1. A safety seat for a vehicle, said safety seat comprising a seat module and a base module, wherein the seat module is demountably attachable to the base module and wherein the safety seat is configurable, in use, between rearward-facing and forward-facing orientations; wherein the base module includes a retractable and pivotable support leg and a headrest element and wherein the seat module is adapted to interact with the headrest element to prevent pivoting of the support leg when the support leg is in an extended position.

2. A safety seat as claimed in claim 1 wherein the headrest element comprises a headrest body pivotably mounted upon the base module.

3. A safety seat as claimed in claim 2 wherein the support leg is pivotably mounted upon the headrest body.

4. A safety seat as claimed in claim 1 wherein the base module includes a first surface defining, in rearward-facing configuration, a first lower surface which, in use, sits upon a surface of a vehicle seat.

5. A safety seat as claimed in claim 4 wherein the first lower surface generally defines a base plane and the angle between the support leg when in the extended configuration and the base plane is greater than 90°.

6. A safety seat as claimed in claim 1 wherein the support leg includes a telescoping leg assembly.

7. A safety seat as claimed in claim 6, wherein the support leg is pivotably mounted at one end of the telescoping leg assembly.

8. A safety seat as claimed in claim 1 wherein the headrest body is pivotably mounted upon a headrest rail, slidably mounted in the base module.

9. A safety seat as claimed in claim 1 wherein the support leg is mounted in the base module.

10. A safety seat as claimed in claim 9, wherein the telescoping leg assembly is slidably mounted upon a guide rail assembly and is slidable between a stowed position and an extended position whereby the leg assembly is pivotable with respect to the base module.

11. A safety seat as claimed in claim 1 wherein the support leg is pivotably mounted upon the headrest element.

* * * * *